United States Patent [19]

D'Amico

[11] 3,929,857

[45] Dec. 30, 1975

[54] 1,1-DI(AMINOALKYLTHIO)-2,2-DICYANOETHYLENES

[75] Inventor: John Joseph D'Amico, Akron, Ohio

[73] Assignee: Monsanto Company, St. Louis, Mo.

[22] Filed: Aug. 8, 1973

[21] Appl. No.: 386,756

Related U.S. Application Data

[62] Division of Ser. No. 224,968, Feb. 9, 1972, Pat. No. 3,776,891.

[52] U.S. Cl. .............. 260/465.5 R; 260/239 B; 260/239 BA; 260/243 B; 260/247.1; 260/293.51; 260/326.84; 260/464; 260/465 E; 260/783; 260/784

[51] Int. Cl.² ....................................... C07C 121/30

[58] Field of Search .......... 260/465.5 R, 464, 465 E

[56] References Cited
UNITED STATES PATENTS
3,723,498   3/1973   Joos ............................. 260/465.5 R OTHER PUBLICATIONS
Middleton, et al., *J.A.C.S*, (80), 1958, pp. 2822–2829.

*Primary Examiner*—Joseph P. Brust

[57] ABSTRACT

Compounds of the formula
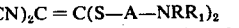
$(CN)_2C = C(S-A-NRR_1)_2$
which are accelerators for the vulcanization of rubber.

6 Claims, No Drawings

1,1-DI(AMINOALKYLTHIO)-2,2-DICYANOETHYLENES

This is a division of application Ser. No. 224,968, filed Feb. 9, 1972, now U.S. Pat. No. 3,776,891, issued Dec. 4, 1973.

This invention relates to new compounds which are useful as accelerators in the vulcanization of rubber. More particularly, it relates to aminoalkylthio dicyanoethylenes.

Sulfur derivatives of dicyanoethylenes are known. For example, alkylthio derivatives of 2,2-dicyanoethylene are described by Edwards and Kendall as useful intermediates for the preparation of dyes, U.S. Pat. No. 2,533,233. Vest describes thiocarbamyl 1,2-dicyanoethylenes as accelerators for the vulcanization of rubber, U.S. Pat. No. 3,197,472. Applicant herein discovered a class of dicyanoethylenes which exhibit accelerator activity in the absence of the thiocarbamyl moiety.

SUMMARY OF THE INVENTION

The compounds of this invention are characterized by the formula $$(CN)_2C = C(S-A-NRR_1)_2$$

in which the symbol A stands for straight or branched chain alkylene of 2–4 carbon atoms, for example, dimethylene, 1-methyl-dimethylene, trimethylene, 1-methyl-trimethylene or tetramethylene. Compounds wherein A is dimethylene are preferred. Considerable variations in the amino portion of the molecule may be made without interfering with the accelerating properties of the compounds so produced. Aliphatic amino and heterocyclic amino radicals are suitable for the practice of this invention. The radicals R and $R_1$ independently are lower alkyl, aralkyl or cycloalkyl or R and $R_1$ together with the nitrogen atom may form a heterocycle. Lower alkyl means branched or unbranched alkyl of 1–6 carbon atoms, examples of which are methyl, ethyl, propyl, isopropyl, n-butyl, sec-butyl, isobutyl, tert-butyl, n-amyl, sec-amyl, iso-amyl and hexyl. Aralkyl radicals of 7–10 carbon atoms are satisfactory, for example, benzyl, phenethyl, $\alpha$-methyl benzyl, $\alpha,\alpha$-dimethyl benzyl and 4-methylbenzyl with benzyl being preferred. Cyclohexyl is the preferred cycloalkyl radical but cycloalkyl radicals of 5–8 carbon atoms are suitable, for instance, cyclopentyl, 2-methylcyclohexyl, 2,6-dimethylcyclohexyl, cycloheptyl and cyclooctyl.

Examples of aliphatic amino radicals are dimethylamino, diethylamino, di-n-propylamino, diisopropylamino, di-n-butylamino, diisobutylamino, di-sec-butylamino, di-n-amylamino, diisoamylamino, methylethylamino, methylpropylamino, ethylbutylamino, dibenzylamino, N-methyl benzylamino, N-ethyl benzylamino, dicyclohexylamino, N-methyl cyclohexylamino, N-ethyl cyclohexylamino and N-propyl cyclohexylamino.

The R and $R_1$ radical may be joined so that together with the nitrogen atom there is formed a heterocyclic radical of 4–8 carbon atoms. The heterocyclic ring may also be interrupted by sulfur or oxygen. Examples are 1-pyrrolidinyl, 2,5-dimethyl-1-pyrrolidinyl, piperidino, 2-methyl piperidino, 2,6-dimethyl piperidino, morpholino, thiomorpholino, 4,6-dimethyl morpholino, hexahydro-1H-azepin-1-yl, hexahydro-1(2H)azocin-1-yl, octahydro-1H-azonin-1-yl and 3-azabicyclo[3.2.2]non-3-yl.

Representative examples of compounds of this invention are 1,1-di(N,N-dimethylaminoethylthio)-2,2-dicyanoethylene, 1,1-di(N,N-dimethylaminopropylthio)-2,2-dicyanoethylene, 1,1-di(N,N-dimethylaminoisopropylthio)-2,2-dicyanoethylene, 1,1-di(N,N-dimethylaminobutylthio)-2,2-dicyanoethylene, 1,1-di(N,N-diethylaminoethylthio)-2,2-dicyanoethylene, 1,1-di(N,N-di-n-propylaminoethylthio)-2,2-dicyanoethylene, 1,1-di(N,N-di-n-butylaminopropylthio)-2,2-dicyanoethylene, 1,1-di(N,N,-di-n-amylaminoethylthio)-2,2-dicyanoethylene, 1,1-di(N,N-diisopropylaminobutylthio)-2,2-dicyanoethylene, 1,1-di(N,N-dibenzylaminoethylthio)-2,2-dicyanoethylene, 1,1-di(N-methyl-N-benzylaminoethylthio)-2,2-dicyanoethylene, 1,1-di(N,N-dicyclohexylaminoethylthio)-2,2-dicyanoethylene, 1,1-di(N-methyl-N-cyclohexylaminopropylthio)-2,2-dicyanoethylene, 1,1-di(1-pyrrolidinylethylthio)-2,2-dicyanoethylene, 1,1-di(2,5-dimethyl-1-pyrrolidinylethylthio)-2,2-dicyanoethylene, 1,1-di(piperidinoethylthio)-2,2-dicyanoethylene, 1,1-di(morpholinoethylthio)-2,2-dicyanoethylene, 1,1-di(hexahydro-1H-azepin-1-ylethylthio)-2,2-dicyanoethylene, 1,1-di(hexahydro-1(2H)azocin-1-ylethylthio)-2,2-dicyanoethylene, and 1,1-di(octahydro-1H-azonin-1-ylethylthio)-2,2-dicyanoethylene. It is appreciated that for the sake of simplicity in naming the compounds that the dimethylene, trimethylene, 1-methyl-dimethylene and tetramethylene radicals are called ethyl, propyl, isopropyl and butyl respectively.

The compounds are prepared by reacting dipotassium 1,1-dimercapto-2,2-dicyanoethylene, $(KS)_2C=C(CN)_2$, U.S. Pat. No. 3,048,596, with the appropriate aminoalkyl chloride hydrochloride. Examples of aminoalkyl chloride intermediates are gamma-diethylaminopropyl chloride hydrochloride, beta-diethylaminoethyl chloride hydrochloride, beta-diisopropylaminoethyl chloride hydrochloride, beta-dimethylaminoethyl chloride hydrochloride, beta-dimethylaminoisopropyl chloride hydrochloride, gamma-dimethylaminopropyl chloride hydrochloride, beta-1-pyrrolidinylethyl chloride hydrochloride, beta-piperidinoethyl chloride hydrochloride, beta-morpholinoethyl chloride hydrochloride, gamma-hexahydroazepin-1-ylpropyl chloride hydrochloride and beta-hexahydro-1(2H)-azocin-1-ylethyl chloride hydrochloride. Some of the intermediates may be obtained from commercial sources, but all of them are easily prepared by reaction of thionyl chloride with hydroxyalkylamine.

The accelerators of this invention are used in the same manner as conventional accelerators. They enhance the vulcanization rate of any sulfur-vulcanizable diene rubber stock and may be used with natural rubber, synthetic rubber or mixtures thereof. Suitable synthetic rubbers include cis-4-polybutadiene, butyl rubber, ethylene-propylene terpolymers, polymers of 1,3-butadiene, polymers of isoprene and copolymers of 1,3-butadiene, for example, with styrene, acrylonitrile, isobutylene and methylmethacrylate.

The accelerators are particularly applicable to rubber compositions containing sulfur-vulcanizing agents. Sulfur-vulcanizing agent means elemental sulfur or sulfur containing vulcanizing agent which at cure temperature or below releases sulfur in the form available to cross-link the rubber. Illustrative vulcanizing agents are amine and polymeric polysulfide, for example, alkyl phenol disulfides and dimorpholinodisulfide. Of course, the rubber compositions may contain the usual compounding ingredients, for example, reinforcing pigments such as carbon black or silica, metal oxide activators such as zinc oxide, organic activators such as diphenylguanidine, stearic acid, antidegradants of the phenolic or amine type, for example, alkylene-bridged cresols, styrenated phenol, stearically-hindered hydroquinones, quinolines and N-alkyl-N'-phenyl-p-phenylenediamines. The rubber may also contain tackifiers, bonding agents such as the phenolformaldehyde resins, and inhibitors may be used if required, for example, N-(cyclohexylthio)phthalimide.

The amount of accelerator used varies somewhat depending upon the other components in the vulcanizable composition and upon the properties desired of the vulcanizate. The optimum accelerator level is readily determined by those skilled in the art of rubber vulcanization. Usually, the amount is between 0.2–5 parts per 100 parts of elastomer but more commonly the amount is 0.5–2.0 parts.

For all the rubber stocks tested and described below as illustrative of the invention, Mooney scorch times at 121°C are determined by means of a Mooney plastometer. The time in minutes ($t_5$) required for the Mooney plastometer reading to rise five points above the minimum viscosity is recorded. Vulcanizates are prepared by curing in a press at the temperature indicated and the physical properties determined in the conventional manner.

DESCRIPTION OF THE PREFERRED EMBODIMENTS

Example 1

To a stirred solution of 43.7 g (0.2 mole) of dipotassium 1,1-dimercapto-2,2-dicyanoethylene, 64 g (0.4 mole) of 25% NaOH and 400 ml of water, there is added at 25°–30°C 57.6 g (0.4 mole) of beta-dimethylaminoethyl chloride hydrochloride. After stirring the mixture for one day at room temperature, the precipitate is collected by filtration, washed with cold water until neutral to litmus and air dried at 25°–30°C. 1,1-di(N,N-dimethylaminoethylthio)-2,2-dicyanoethylene is recovered in 70% yield which upon recrystallization from acetone melts at 158°–159°C. Analysis gives 20.33% N and 22.88% S compared to 19.70% N and 22.55% S calculated for $C_{12}H_{20}N_4S_2$.

Example 2

The procedure of Example 1 is followed except beta-diisopropylaminoethyl chloride hydrochloride is used as reactant. 1,1-di(N,N-diisopropylaminoethylthio)-2,2-dicyanoethylene is recovered in 98% yield. Recrystallized from alcohol, the product melts at 44°–45°C. Analysis gives 14.42% N and 15.94% S compared to 14.13% N and 16.17% S calculated for $C_{20}H_{36}N_4S_2$.

Example 3

The procedure is repeated using beta-3-azabicyclo[3.2.2]non-3-ylethyl chloride hydrochloride as reactant to give 1,1-di(3-azabicyclo[3.2.2.]non-3-ylethylthio)-2,2-dicyanoethylene in 97% yield. The product recrystallized from alcohol melts at 63°–65°C. Analysis gives 12.43% N and 14.08% S compared to 12.60% N and 14.42% S calculated for $C_{24}H_{36}N_4S_2$.

Example 4

By the same procedure using beta-hexahydro-1H-azepin-1-yl-ethyl chloride hydrochloride, 1,1-di(hexahydro-1H-azepin-ylethylthio)-2,2-dicyanoethylene, m.p. 147°–149°C recyrstallized from dimethylformamide, is obtained in 64% yield. Analysis gives 14.36% N and 16.14% S compared to 14.27% N and 16.23% S calculated for $C_{20}H_{32}N_4S_2$.

Example 5

When the procedure is repeated with beta-diethylaminoethyl chloride hydrochloride as reactant, the reaction product is an oily semi-solid which is recovered by decanting the aqueous layer from the solid. The solid is washed twice with 150 ml portions of water and then recrystallized from 200 ml of ethyl alcohol. 1,1-di(N,N-diethylaminoethylthio)-2,2-dicyanoethylene is recovered. The product recrystallized twice from alcohol melts at 140°–141°C. Analysis gives 16.83% N and 18.97% S compared to 16.45% N and 18.83% S calculated for $C_{16}H_{28}N_4S_2$.

To illustrate the accelerator activity of the compounds, a masterbatch is prepared containing the following ingredients. All parts by weight.

|  | Parts |
| --- | --- |
| Natural Rubber | 100 |
| HAF Carbon Black | 50 |
| Zinc Oxide | 5 |
| Stearic acid | 3 |
| Processing oil | 3 |
| Total | 161 |

Vulcanizable stocks are prepared by incorporating sulfur, accelerator and amine antidegradant into portions of the masterbatch. The stocks are cured at 144°C for 60 minutes. The properties of the vulcanizable compositions and of the vulcanizates are shown in the table below.

| Stock No. | 1 | 2 | 3 | 4 |
| --- | --- | --- | --- | --- |
| Masterbatch | 161 | ⟶ | | |
| Sulfur | 2.5 | ⟶ | | |
| N-phenyl-beta-naphthylamine | 1.0 | ⟶ | | |
| 1,1-di(N,N-dimethylaminoethylthio)-2,2-dicyanoethylene | 0.5 | — | — | — |
| 1,1-di(N,N-diethylaminoethylthio)-2,2-dicyanoethylene | — | 0.5 | — | — |
| 1,1-di(N,N-diisopropylaminoethylthio)-2,2-dicyanoethylene | — | — | 0.5 | — |
| 1,1-di(3-azabicyclo[3.2.2]non-3-ylethylthio)-2,2-dicyanoethylene | — | — | — | 0.5 |
| Mooney Scorch at 121°C | | | | |
| $t_5$ | 22.6 | 14.6 | 21.8 | 15.3 |
| Stress-Strain Data at 144°C | | | | |
| 300% Modulus, psi | 1650 | 1820 | 1330 | 1520 |
| Ult. tensile strength | 2500 | 2700 | 2400 | 2800 |
| Ult. Elongation, % | 440 | 440 | 450 | 480 |

The data show that the vulcanizable compositions containing the accelerators have adequate processing safety and that the compositions vulcanize to give vulcanizates with good physical properties. Similar results are obtained with stocks containing 1,1-di(hexahydro-1H-azepin-1-ylethylthio)-2,2-dicyanoethylene. Synthetic rubber stocks containing the subject accelerators also exhibit excellent properties, however, it is recommended that one part accelerator be used.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula $(CN)_2C = C(S-A-NRR_1)_2$ in which A is dimethylene, 1-methyl-dimethylene, trimethylene, 1-methyl-trimethylene or tetramethylene, and R and $R_1$ independently are lower alkyl, aralkyl of 7–10 carbon atoms, or cycloalkyl of 5–8 ring carbon atoms or R and $R_1$ together with the nitrogen is a heterocyclic radical of 4–8 carbon atoms.

2. The compound of claim 1 in which A is dimethylene.

3. The compound of the formula
 $(CN)_2C = C(S-A-NRR_1)_2$
in which A is dimethylene and R and $R_1$ are lower alkyl.

4. The compound of claim 3 in which R and $R_1$ are methyl.

5. The compound of claim 3 in which R and $R_1$ are ethyl.

6. The compound of claim 3 in which R and $R_1$ are isopropyl.

* * * * *